United States Patent [19]

Kubota et al.

[11] Patent Number: 4,893,189
[45] Date of Patent: Jan. 9, 1990

[54] PORTABLE IMAGE SCANNER

[75] Inventors: Mineo Kubota, Yamanashi; Kenji Masuyama, Kofu, both of Japan

[73] Assignee: Nippon Seimitsu Kogyo Kabushiki Kaisha, Kofu, Japan

[21] Appl. No.: 214,050

[22] Filed: Jun. 30, 1988

[30] Foreign Application Priority Data

Sep. 11, 1987 [JP] Japan .............................. 62-139893[U]

[51] Int. Cl.$^4$ ........................................... H04N 1/024
[52] U.S. Cl. .................................... 358/471; 358/474; 382/59
[58] Field of Search .................... 358/294, 285; 382/59

[56] References Cited
U.S. PATENT DOCUMENTS 4,800,444  1/1989  Suzuki et al. ........................ 358/294
4,819,083  4/1989  Kawai et al. ......................... 358/294

Primary Examiner—Edward L. Coles, Sr.
Attorney, Agent, or Firm—Oblon, Spivak, McClelland, Maier & Neustadt

[57] ABSTRACT

Reflected image light obtained by illuminating a reading portion to be read on a given objective image plane is sent to an image sensor located on the rear side through a reflecting member disposed substantially just above the reading portion. By forming a viewing path inclined forward against the image sensor so as to permit the reading portion to be observed easily, the desired image light reflected from the reading portion is little interfered with external light entering inside the scanner through the viewing path, thereby to enjoy image processing of high quality.

10 Claims, 4 Drawing Sheets

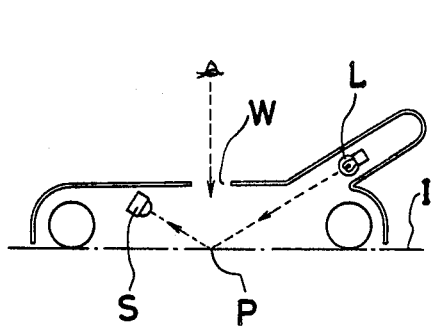
FIG._1 PRIOR ART
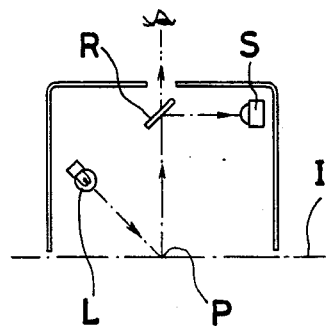
FIG._2 PRIOR ART
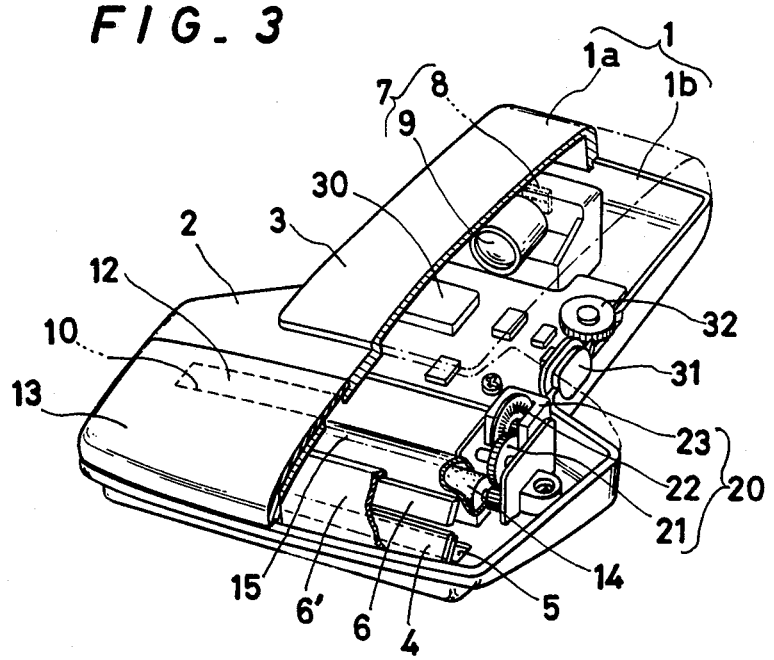
FIG._3

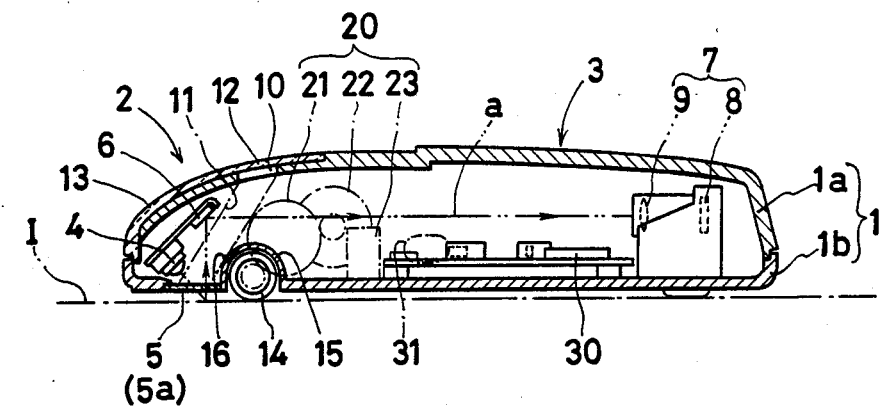
FIG_4
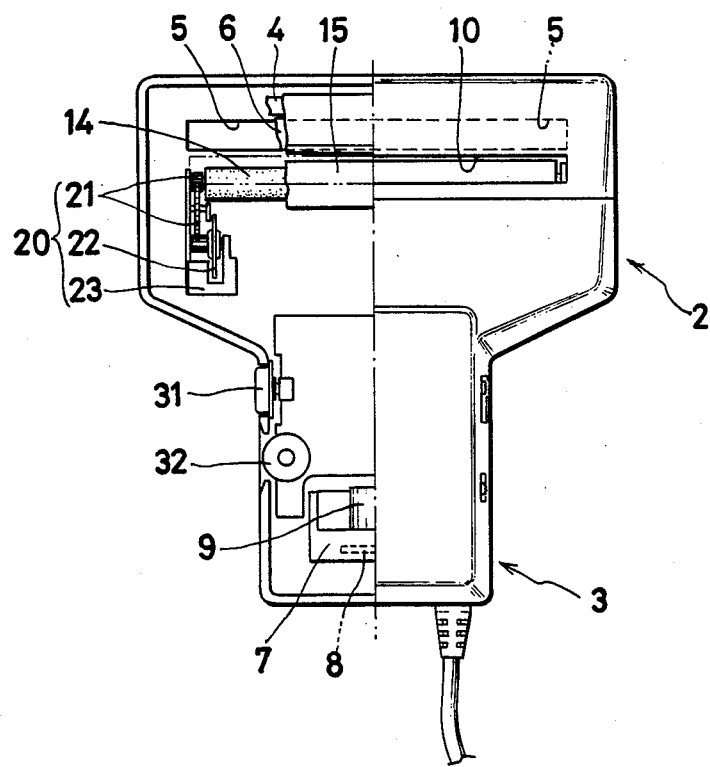
FIG_5

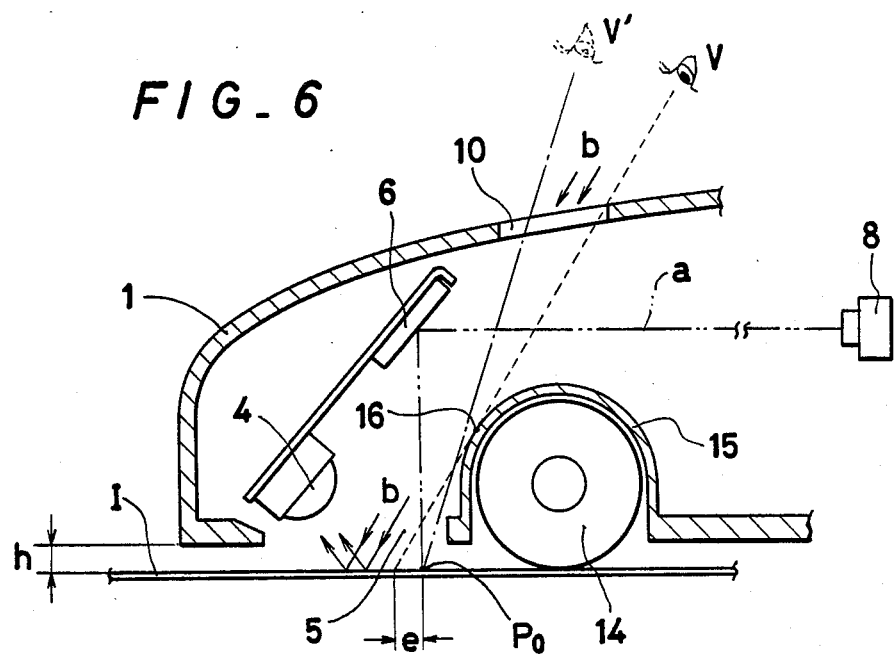
FIG_6
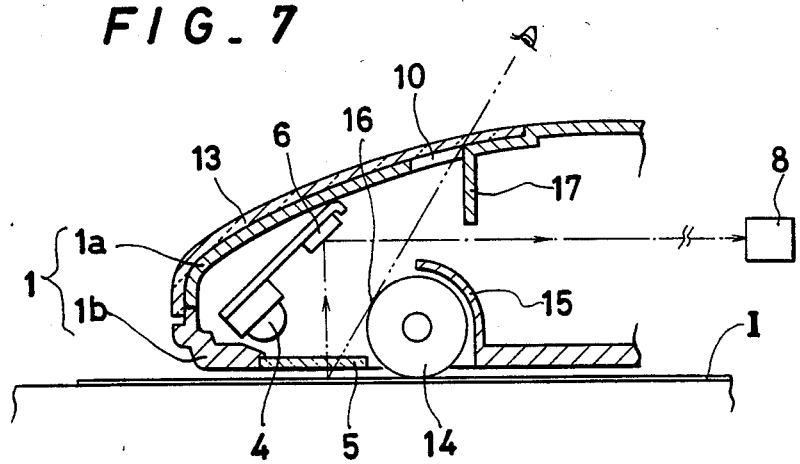
FIG_7

FIG_8
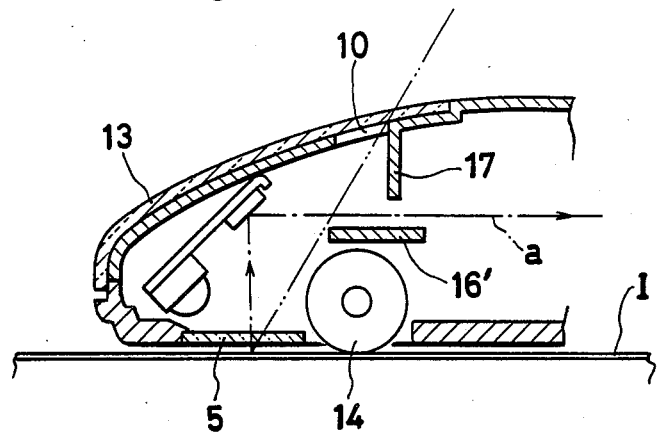
FIG_9
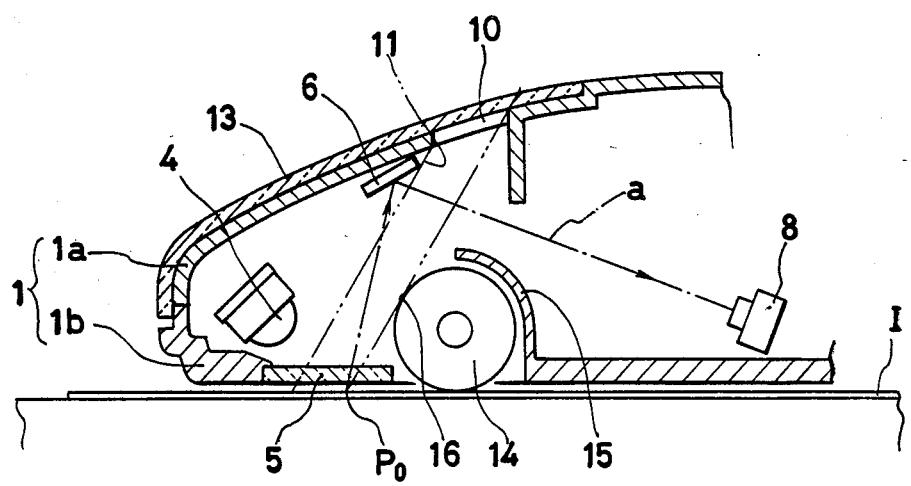

PORTABLE IMAGE SCANNER

BACKGROUND OF THE INVENTION

1. Field of the Invention:

This invention relates to an image scanner for giving image data to an image processing device such as a word-processor or a computer to effect image processing, and more particularly to a portable scanner having a peep hole through which an image portion to be read on a given objective image plane can easily be observed, but external light affecting the reading of the objective image is little allowed to pass.

2. Description of the Prior art:

There have been proposed various types of image scanners or image readers in recent use, which are adapted to scan over a given objective image plane such as a picture or printed matter so as to read out image information from the image plane and output image data to an image processing device such as a computer or word-processor for the purpose of image processing. Among these conventional image scanners is one called a portable image scanner. Generally, the portable image scanner is composed of, as fundamental elements, a light source for illuminating a reading portion to be read on the objective image plane, an image sensor for converting optical image information read from the objective image plane into electric image signals, and an optical system including a converging lens for introducing reflected light from the objective image plane into the image sensor. Some of the conventional portable image scanners have a viewing structure for allowing the reading portion on the objective image plane to be observed with the eye for positional confirmation, which reading portion is closed to the view by the scanner proper, as disclosed in Japanese Patent Publication SHO No. 45(1970)-13858; Japanese Utility Model Publication SHO No. 54(1979)-7719; and Japanese Utility Model Application Public Disclosures SHO No. 51(1976)-81035(A); SHO No. 55(1980)-14694(A); SHO No. 57(1982)-185063(A); SHO No. 60(1985)-170866(A); and SHO No. 61(1986)-176857(A). The viewing structure in any of the aforesaid conventional image scanners is adapted to facilitate proper positioning of the scanner for scanning the given objective image plane. However, the conventional portable image scanners cannot exactly adjust the reader part of the scanner at a desired reading position to be read on the objective image plane and have a disadvantageous factor causing the accuracy of the image reading to be decreased.

To be specific, in FIG. 1, there is shown one example of the prior art image scanners, which has a viewing window W formed right above the reading portion P on a given objective image plane I between a light source L and an image sensor S. Through the viewing window W, ambient light enters inside the scanner body and is scattered on the image plane I. The scattered light is mingled as noise component in a desired image light reflected from the objective image plane I. As a result, the image sensor S receives the desired image light interfered with the undesirable scattered light brought about by the external light. Thus, the light is influenced by the external light, with the result that the quality of a reproduced image obtained by an image processing device such as a computer is remarkably decreased. Moreover, since the light source L and the image sensor S are positioned symmetrically with each other about the reading portion P, when the objective image plane to be read is glossy, the image plane glares under illumination of the light source L, thereby to make it difficult or impossible to reliably read out the image from the objective image plane. Besides, since the objective image plane is read sideways by the image sensor, the reproduced image obtained by the image processing device is apt to be distorted.

In a prior art image scanner as illustrated schematically in FIG. 2, a semi-permeable reflecting means (half mirror) R is interposed in a light path extending from the reading portion P on an objective image plane I to the image sensor S, so that an operator can observe the reading portion P for positional confirmation through the reflecting means R. However, the desired image light reflected from the objective image plane I is attenuated to lower the luminescent efficiency due to the semi-permeable reflecting means R.

There has been need for a handy image scanner which permits the viewing of the reading portion on the objective image plane to be performed more easily in a reading operation and can be handled with ease.

SUMMARY OF THE INVENTION

The present invention aims to eliminate the aforementioned drawbacks of conventional portable image scanners. One object of the invention is to provide a portable and handly image scanner which permits an image portion being read on a given objective image plane to be easily observed for positional confirmation, but does not permit the reading portion to be influenced by external ambient light, thereby to assure reproduction of the image of high quality on an image processing device such as a word processor and a computer.

The present invention attains the aforementioned object by providing a portable image scanner comprising a light source for illuminating an image portion to be read on an objective image plane, an image sensor which receives image light reflected from the objective image plane and outputs image data signals, a housing accommodating the light source and the image sensor, which housing is provided in its bottom surface with a reading aperture and in its upper surface with a peep hole displaced to the image sensor side with respect to the position right above the reading aperture so as to form a viewing path slanted forward from the peep hole to the reading aperture against or toward the image sensor side, a sub-scanning drive member for permitting the housing to move in a sub-scanning direction, and a reading-position limiting or determining means disposed to define the viewing path.

A desired image light which is reflected from the objective image plane illuminated by the light source is sent to the image sensor via a reflecting member, but not much affected by external ambient light entering inside the housing through the peep hole formed in the upper surface of the housing because the viewing path extending from the peep hole to the reading aperture is arranged aslant forwardly against or toward with respect to a vertical plane the image sensor located at the rear portion in the housing. The external ambient light which enters the housing and reaches the reading portion within view of the reading aperture bounces forward on the reading portion on the objective image plane, but is little reflected in the direction in which the desired image light travels from the reading portion on the objective image plane to the image sensor through the reflecting member. Thus, the influence of the external light on the desired image light can be reduced to a minimum. Furthermore, the inclined viewing path extending from the peep hole to the reading aperture points to the eye of an operator so that the reading portion on the objective image plane can easily be observed. With the reading-position limiting or determining means, the reading portion on the objective image plane can be precisely adjusted.

The reading-position determining means may be formed integrally within the housing or by utilizing a part of the sub-scanning drive member such as a roller.

The other objects and the characteristics of the present invention will become apparent from the further disclosure of the invention to be made hereinafter with reference to the accompanying drawings.

BRIEF DESCRIPTION OF THE DRAWINGS:

One prior image scanner and some embodiments of the present invention will now be described with reference to the accompanying drawings, in which:

FIG. 1 is an explanatory diagram schematically showing a conventional image scanner.

FIG. 2 is a schematic diagram showing another conventional image scanner.

FIG. 3 is a partially sectioned perspective view showing one embodiment of a portable image scanner according to the invention.

FIG. 4 is a side sectional view of the same.

FIG. 5 is a plan view, partly in axial section, of the same.

FIG. 6 is a partially enlarged sectional side view of the same.

FIG. 7 is a partially enlarged sectional side view showing another embodiment of the invention.

FIG. 8 is a partially enlarged sectional side view showing still another embodiment of the invention.

FIG. 9 is a partially enlarged sectional side view showing yet another embodiment of the invention.

DESCRIPTION OF THE PREFERRED EMBODIMENTS:

The portable image scanner according to the present invention has a viewer structure for permitting a reading portion on a given objective image plane to be easily observed, in which the reading portion is little influenced by external ambient light. One preferred embodiment of the present invention will be described with reference to FIGS. 1 to 3.

In the drawings, reference numeral 1 denotes a housing of the image scanner. The housing 1 is generally composed of an upper casing 1a and a lower casing 1b and has a wider front half referred as to an image reader part 2 and a slender rear half referred as to a grip part 3 so as to assume the overall appearance of a substantially T-shape. However, the appearance of the housing 1 is not necessarily formed in a T-shape, because the width of the image reader part 2 is determined in accordance with the desired effective width of the objective image plane to be scanned for reading the given image. Thus, the overall apparence of the image scanner may assume any shape as required.

The housing 1 accommodates a mechanism for optically reading the given image such as characters and patterns on the objective image plane I such as a sheet of paper. The image reading mechanism comprises a light source 4 for illuminating the reading portion of the objective image plane I within view of a reading aperture 5 formed in the lower casing 1b, a reflecting member 6 located substantially just above and at least partially vertically offset from the reading operture 5 and adapted to refract a desired image light a reflected from the objective image plane I in the direction substantially parallel to the objective image plane I, and an image processing unit 7 including an image sensor 8 for converting the reflected image light a from the objective image plane I into electric image signals.

In this embodiment, there is adopted a line scanning method in which the given objective image plane to be scanned for reading is notionally divided into a plurality of sub-scanning lines and scanned every sub-scanning lines in order. Namely, the image reading is carried out by moving the scanner over the image plane I in the sub-scanning direction. Therefore, the reading aperture 5 in this embodiment, which opens in the lower casing 1b at the reader part 2, is formed like a slot and elongated in the main-scanning direction (sidewise direction in FIG. 5). The reading aperture 5 may be covered with a transparent plate 5' as illustrated.

Though various types of lamps or luminous means may be used as the light source 4 for illuminating the reading portion of the objective image plane which is sighted through the reading aperture 5, an array of light emitting diodes (LED) is preferably adopted in this embodiment. The LED array can be advantageously used as the light source 4 because it is low in power dissipation and small in size and weight. However, this should not be understood as limitative.

The light source 4 is disposed on the forward upperside of the reading aperture 5 so as to illuminate the reading aperture 5 from the upper front. The reflecting member 6 disposed substantially right above the reading aperture 5 has a total reflection surface and is inclined at an angle of 45° relative to the objective image plane I so that only the light component reflected vertically from the objective image plane I is refracted or reflected in the horizontal direction and sent to the image sensor 8. The light source and the reflecting member may be together held by a supporting member 6'.

The image processing unit 7 is mounted inside the grip part 3 and has an optical system 9 including a converging lens for focusing the reflected image light a on the image sensor 8. It is preferable to use a CCD line sensor as the image sensor 8 for converting the reflected image light a sent through the reflecting members 4 and the optical system 7 into image data signals which are generally referred as to video signals.

Denoted by 10 is a peep hole formed in the upper casing 1a of the housing 1 for giving a view of the reading portion on the objective image plane I. The peep hole 10 is located on the rearward side of the portion right above the reading aperture 5, namely, displaced toward the image sensor 8 located on the rear side of the scanner.

Between the peep hole 10 in the upper casing 1a and the reading aperture 5 in the lower casing 1b extends a viewing path 11. The viewing path 11 is formed aslant forwardly toward against the image sensor with respect to a vertical plane, because the peep hole 10 is displaced to the image sensor side and arranged out of the reflecting member 6. Therefore, the reading portion on gthe objective image plane can be observed through the viewing path 11 when viewed from the upper rear.

Owing to the viewing path 11 formed aslant forwardly, the external ambient light b, which enters the housing 1 through the peep hole 10 and impinges on the reading portion within view of the reading aperture 5, bounces forwardly on the objective image plane in the direction opposite to the image sensor 8 as illustrated in FIG. 6, and therefore, it does not much affect the desired image light a reflected vertically from the objective image plane.

The inside of the housing 1 is substantially shielded from ambient light except for the reading aperture and the peep hole 10. To mitigate the intensity of the external light entering inside the housing 1 through the peep hole 10, the peep hole 10 is closed with a filter member 12 having low permeability to light, which is made of, for example, glass or synthetic resin such as acrylic resin. It is preferable to form the filter member 12 integrally with a decorative cover 13 covering the front half of the image reader part 2. The decorative cover 13 may be made by coloring a transparent resin materal.

By 14 is denoted a sub-scanning drive means which is disposed on the lower casing 1b for allowing the image scanner to smoothly move in the sub-scanning direction (downward direction in FIG. 6). The sub-scanning drive means 14 is formed in the shape of a roller in this embodiment and partly covered with a guard cover 15 which is formed by denting upwardly a part of the lower casing 1b of the housing 1 in a semicylindrical shape.

By locating the guard cover 15 substantially just under the peep hole 10, the incident external light entering vertically inside the housing 1 through the peep hole 10 impinges on the upper surface of the guard cover 15 and is scattered upward. Thus, the reading portion within view of the reading aperture 5 is little exposed to the undesirable external ambient light. The location of the sub-scanning drive means (roller) 14 is not limited in this embodiment because the roller 14 is covered with the guard cover 15. However, in a case where the guard cover 15 is omitted, the roller 14 should be located just under the peep hole 10.

It is desirable to dispose the roller 14 closer to the reading aperture 5 to assure high stability of the sub-scanning movement of the scanner. The guard cover 15 is so designed that its outer periphery tangentially touches or somewhat projects before a straight line connecting the rear edge of the peep hole 10 and the rear edge of the reading aperture 5 so as to form a reading-position limiting or determining means 16 at the tangent point on the outer periphery of the guard cover 15. With the aforesaid reading-position determining means 16, the parallax caused by shifting a point of sight can be eliminated, thereby to enable the reading aperture 5 to be precisely decided with ease at a requied position to be read on the objective image plane. To be specific, a visual field limited by the reading aperture 5 is shifted by the amount of e with shifting the visual point v to the point v', because the bottom of the lower casing 1b having the reading aperture 5 is apart from the objective image plane I at the distance h. Thus, by fixing the visual point on the extension of the line connecting the reading-position limiting or determining means 16 and the rear edge of the peep hole 10, the proper reading position can easily be decided with accuracy on the objective image plane. Therefore, it is desirable to determine the reading point Po at the intersection of the extension of the line connecting the reading-position limiting or determining means 16 and the objective image plane I.

Since it is desirable to dispose the roller 14 closer to the reading aperture 5 so as to stabilize the distance from the bottom of the housing to the objective image plane as is explained formerly, the roller 14 can be brought closer to the reading aperture 5 with decreasing the roller 14 in diameter. However, the diameter of the roller 14 influences the efficiency of rotation of the roller, and therefore, it is undesirable to make the roller small to excess.

The reading-position determining means 16 may be formed of one part of the periphery of the roller 14 as shown in FIG. 7. In this embodiments, the guard cover 15' may be formed so as to have a quarter-circular cross section or omitted. And, a shielding member 17 may be formed by extending downward the rear edge portion of the peep hole 10 so as to prevent undesirable light from entering the image sensor 8 as illustrated in FIG. 7.

FIG. 8 illustrates still another embodiment having a reading-position limiting or determining means 16' disposed between the peep hole 10 and the reading aperture 5.

Onto the roller 14, there is attached a sub-scanning detector 20 for renewing the scanning line with moving the scanner by the predetermined amount in the sub-scanning direction. The sub-scanning detector 20 comprises at least one gear 21 for transmitting the rotational motion of the roller 14, a synchronizing rotary disc 22 which rotates synchronously with the roller 14, and a rotation detector 23 for detecting the rotational motion of a predetermined amount of the rotary disc 22. The rotary disc 22 has many slots arranged radially in the peripheral portion thereof. As the rotation detector 23, a photocoupler or photointerrupter may be used so that switching action can be effected by the existence of the slots formed in the rotary disc 22, thereby to output sub-scanning electric pulses by the angular rotation of the predetermined amount of the rotary disc 22.

Furthermore, the image scanner is provided with a control unit 30 for treating the image data signals or video signals outputted from the image sensor 8 in accordance with the sub-scanning pulses obtained from the sub-scanning detector 20. The control unit 30 possesses magnification-varying function, shading-correcting function, density-adjusting function and so on similarly to any other ordinary image scanner and is operated by manually switching on a switch 31 disposed the housing 1. The image scanner has a dial 32 for adjusting the density of a read-out image processed by and reproduced on the image processing device such as a computer.

Although the reflecting member 6 is disposed substantially right above the reading aperture 5 is in the foregoing embodiments, the reflecting member 6 may be placed rearward to a slight degree as shown in FIG. 9, unless it intrudes into the inclined viewing path 11 defined between the peep hole 12 and the reading aperture 5. Moreover, the image sensor 8 is not necessarily leveled with the reflecting member 6 and may be disposed on the lower portion inside the housing 1 as illustrated in FIG. 9. In the case where the image sensor 8 is located downwards, the reflex angle of the reflecting member 6 must be determined taking account of the location of the image sensor 8.

As illustrated in FIG. 9, there may be defined the inclined viewing path 16 by the upon edge of the reflecting member 6.

As is plain from the foregoing description, the present invention can provide a handy image scanner having a viewing path through which a reading portion to be read on a given objective image plane can easily be observed. Since the viewing path is arranged aslant forwardly against or toward an image sensor side, a desired image light reflected upward from the reading portion on the objective image plane is little interfered with external ambient light which enters inside the scanner through the viewing path and impinges on the reading portion, thereby to assure reproduction of the image of high quality on an image processing device such as a word processor or a computer. Moreover, the reading position on the objective image plane can precisely be determined with ease in a reading operation by means of a reading-position determining member disposed in the viewing path.

The present invention has been described with reference to several embodiments. It should be noted that this invention is not limited to these embodiments but may be modified in various ways without departing from the technical idea defined in the claims for patent.

What is claimed is:

1. A portable image scanner comprising a light source for illuminating an reading portion to be read on an objective image plane, a reflecting member for refracting image light reflected in a substantially vertical direction from the reading portion, an image sensor which receives said image light sent through said reflecting member and is adapted to convert said image light to corresponding image data signals, a housing accommodating said light source, reflecting member and image sensor, and a sub-scanning drive member for allowing the scanner to move in a sub-scanning direction, said housing being provided at its lower surface with a reading aperture and at its upper surface with a peep hole displaced to the image sensor side with respect to a portion substantially right above said reading aperture so as to form a viewing path inclined against said image sensor side.

2. A portable image scanner according to claim 1, wherein said light source is disposed on the forward upper-side of said reading aperture so as to illuminate said reading aperture from the upper front and said image sensor is disposed on the rearward side of and on a level with said reflecting member.

3. A portable image scanner according to claim 1, further comprising a reading-position determining member disposed in said viewing path.

4. A portable image scanner according to claim 1, wherein said sub-scanning drive member is a roller.

5. A portable image scanner according to claim 4, further comprising a guard cover covering partly of said roller, which guard cover is provided with a reading-position determining member placed in said viewing path.

6. A portable image scanner according to claim 4, wherein said roller is provided on its periphery with a reading-position determining member placed touching tangentially said viewing path.

7. A portable image scanner according to claim 1, further comprising a shielding member formed under said peep hole so as to prevent undesirable light from entering said image sensor.

8. A portable image scanner according to claim 1, wherein said peep hole is closed with a filter member having low permeability to light.

9. A portable image scanner according to claim 8, wherein said filter member is formed in a part of a decorative cover covering partly said housing.

10. A portable image scanner according to claim 3, wherein said viewing path is defined by said reflecting member and said reading-position determining member.

* * * * *

UNITED STATES PATENT AND TRADEMARK OFFICE
CERTIFICATE OF CORRECTION

PATENT NO.   :   4893189
DATED        :   01/09/90
INVENTOR(S)  :   MINEO KUBOTA & KENJI MASUYAMA

It is certified that error appears in the above-identified patent and that said Letters Patent is hereby corrected as shown below:

<u>IN THE CLAIMS</u>

Claim 1, line 2, delete "an" and insert --a--;
         lines 3 and 4, change "refracting" to --reflecting; and
         line 17, after "side" insert --wherein said peep hole is closed by a member having low permeability to light--.

Claim 8, line 2, change "peep hole is closed with" to --member closing said peep hole comprises-- and
         line 3, delete "having low permeability to light".

Claim 9, line 2, delete "filter", after "member" insert --closing said peep hole comprises a cover--; and
         line 2 and 3, delete "is formed in a part of a decorative cover covering partly said housing".

Signed and Sealed this

First Day of October, 1991

Attest:

HARRY F. MANBECK, JR.

Attesting Officer

Commissioner of Patents and Trademarks